United States Patent Office 3,383,170
Patented May 14, 1968

3,383,170
PROCESS FOR THE RECOVERY OF SULPHUR
DIOXIDE AND AMMONIA
Herbert Furkert, Junkersdorf, Cologne, and Hans Muehlenbein, Cologne-Lindenthal, Germany, assignors, by mesne assignments, to Chemiebau Dr. A. Zieren GmbH & Co. KG., Cologne-Braunsfeld, Germany, a corporation of Germany
No Drawing. Filed Jan. 12, 1965, Ser. No. 425,054
Claims priority, application Germany, Jan. 17, 1964, C 31,906
The portion of the term of the patent subsequent to May 23, 1984, has been disclaimed and dedicated to the Public
12 Claims. (Cl. 23—177)

ABSTRACT OF THE DISCLOSURE

A process for the recovery of ammonia and sulfur dioxide from feeds containing $(NH_4)_2SO_4$ and/or $NH_4HSO_4$. When the feed is rich in $(NH_4)_2SO_4$, an addition containing a major portion of $(NH_4)_2SO_4$ is made. The mixture is then heated to decompose the $(NH_4)_2SO_4$, to form $NH_4HSO_4$, and ammonia. The ammonia is recovered. The $NH_4HSO_4$ is partially reduced by heating with a non-carbon reducing agent at a temperature above its melting point, to form $SO_2$ and $(NH_4)_2SO_4$. The resultant mixture is recycled to the feed. When the feed is rich in $NH_4HSO_4$, an addition containing a major portion of $NH_4HSO_4$ is made to the feed. This mixture is then partially reduced with a non-carbon containing reducing agent at a temperature above the melting point of the $NH_4HSO_4$ to liberate $SO_2$, and to form $(NH_4)_2SO_4$. The resultant mixture of $(NH_4)_2SO_4$ and unreduced $NH_4HSO$, is recycled and admixed with the feed. The process is controlled so that the ammonia produced in the decomposition step, and the $SO_2$ produced in the reducing step, correspond to the initial ammonia and sulfate content of the feed.

---

The present invention relates to a process for recovering sulfur dioxide and ammonia from the ammonium salts of sulfuric acid.

Such ammonium salts are often produced as by-products from various industrial processes, including recovery of spent acids from petroleum chemistry, from titanium dioxide production, recovery of ammonium salts from the nitrile saponification with sulfuric acid, and from processes where ammonia is scrubbed with sulfuric acid. Although the literature describes various processes for working up ammonium sulfate and ammonium hydrogen sulfate respectively, such processes involve economic or technical difficulties when applied on plant scale.

In A. M. Schtschuharew, C36I667, the $(NH_4)_2SO_4$ is heated with $Fe_2O_3$, whereby first the $NH_3$, and then by calcination the $SO_3$ is set free. J. W. Delapaine, Chem. Engng. Progr., 51, 499–503 (1955) uses zinc oxide instead of $Fe_2O_3$. In E.P. 2118 it is suggested that $(NH_4)_2SO_4$ be heated together with $Na_2SO_4$, whereby upon formation of $NaHSO_4$, the $NH_3$ escapes. The sodium hydrogen sulphate then releases $SO_3$ at higher temperatures. The processes referred to have not attained technical feasibility for use in the field.

It is one object of the present invention to provide an economic process for recovering ammonia and sulfur dioxide from feeds containing ammonium sulfate and/or ammonium hydrogen sulfate.

It was now found out that ammonium sulphate or hydrogen sulphate or a mixture of both salts respectively can easily be decomposed into $NH_3$ and $SO_2$, if, instead of the above-mentioned admixtures as ZnO, or $Na_2SO_4$, a $(NH_4)_2SO_4$ quantity being equivalent to these materials is added to the chemical cycle, then expelling first the $NH_3$ from the $(NH_4)_2SO_4$ by heating to 200–450° C., preferably at 400° C., and finally converting the $NH_4HSO_4$ with a reducing agent, upon separation of $SO_2$, into ammonium sulphate again which is kept in the cycle. It could be stated that the use of reducing agents containing C (already described in the literature) cause substantial ammonia losses and that $H_2$, $H_2S$, or sulphur surprisingly reduce so carefully, that the $NH_3$ yield is at least 95%.

The process procedure is illustrated by the following formulae.

(a) Ammonium sulphate is treated:

(I)
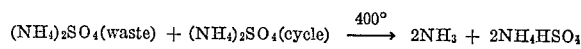
$$(NH_4)_2SO_4(\text{waste}) + (NH_4)_2SO_4(\text{cycle}) \xrightarrow{400°} 2NH_3 + 2NH_4HSO_4$$

(II)
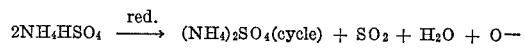
$$2NH_4HSO_4 \xrightarrow{\text{red.}} (NH_4)_2SO_4(\text{cycle}) + SO_2 + H_2O + O-$$

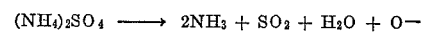
$$(NH_4)_2SO_4 \longrightarrow 2NH_3 + SO_2 + H_2O + O-$$

(b) Ammonium hydrogen sulphate is treated:

(III)
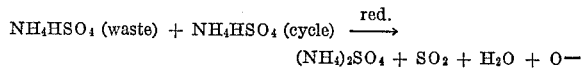
$$NH_4HSO_4(\text{waste}) + NH_4HSO_4(\text{cycle}) \xrightarrow{\text{red.}} (NH_4)_2SO_4 + SO_2 + H_2O + O-$$

(IV)
$$(NH_4)_2SO_4 \xrightarrow{400°} NH_3 + NH_4HSO_4(\text{cycle})$$

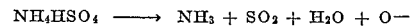
$$NH_4HSO_4 \longrightarrow NH_3 + SO_2 + H_2O + O-$$

Expelling of the $NH_3$ by the Formula I or IV respectively may be accelerated by introducing inert gas or steam or by vacuum. It is not necessary to convert all $(NH_4)_2SO_4$ into $NH_4HSO_4$ since release of the last percent $NH_3$ is not economical. Heating of the solid

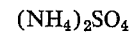
$$(NH_4)_2SO_4$$

is effected advantageously by introducing it into a stock of salt already heated to 350–400° C. and molten. A quantity equal to the feed is permanently withdrawn from this stock and introduced into a column where it is treated in counter-current with superheated steam or other hot inert gases to decompose most of the $(NH_4)_2SO_4$ into $NH_4HSO_4$ and ammonia which is recovered. The ammonium hydrogen sulphate or pyro sulphate respectively, flowing off the column, is reduced at temperatures between 400 and 550° C., i.e., liquid or also in the form of vapors, to such an extent that the $(NH_4)_2SO_4$ salt is produced according to Equation II when cooled to less than 320° C. The reduction of the pyro sulphate can slightly be accelerated by steam. The procedure as per Equation II or III, respectively, is to be understood that of the 2 moles $NH_4HSO_4$, one mole is reduced to $NH_4HSO_3$ or $NH_3$, $SO_2$, and $H_2O$, respectively, which at lower temperature is reacted with the second mole of $NH_4HSO_4$ from the neutral salt and $SO_2$. The $SO_2$ obtained undergoes, if it still contains sulphur scraps from reduction, a recombustion and is then best delivered to a sulphuric acid plant.

Depending on the composition of the ammonium sulphates to be decomposed, the place where same are added to the cycle changes. Neutral sulphate or a mixture with a minor quantity of acid sulphate is best added directly to the $NH_3$ expulsion step (1). Acid sulphate or mixtures with minor quantites of neutral salt need first be converted into the neutral salt by reduction (step 2).

From the foregoing it is apparent that the invention provides an economical cyclic process for recovering ammonia and sulfur dioxide from feed stocks containing ammonium sulfate and/or ammonium hydrogen sulfate. The cyclic process basically consists of two operations, denoted "steps" herein. Step (1) involves decomposing ammonium sulfate at a temperature between about 200° C. and 450° C. and preferably at about 400° C. to form ammonia and ammonium hydrogen sulfate. When the feed to the cyclic process is largely or totally composed of ammonium sulfate, the feed is introduced into the cyclic process at or just before step (1). An amount of ammonium sulfate, preferably equal to the amount of ammonium sulfate in the feed, which has been recycled from a later step in the cyclic process is mixed with the feed. Substantially all of the ammonium sulfate is decomposed in the first step of the process. Since it is not economic to carry the yield to 100% completion, the product of the first step of the process will contain a small amount of ammonium sulfate admixed with the ammonium hydrogen sulfate. This step of the process is preferably carried out by contacting the ammonium sulfate at the elevated temperature with superheated steam in countercurrent relation.

In a second step of the process, the ammonium hydrogen sulfate product of the first step is partially reduced to recover $SO_2$. When the feed to the cyclic process is largely or totally composed of ammonium hydrogen sulfate, the feed is introduced into the cyclic process at or just prior to step (2). When an ammonium hydrogen sulfate feed is used, the amount thereof is preferably controlled so that it is equal to the amount of ammonium hydrogen sulfate product of the decomposition step (1) of the process. Of the total ammonium hydrogen sulfate treated in the second step of the process, the process is controlled so that substantially one-half of the ammonium hydrogen sulfate is reduced to $NH_4HSO_3$ (equivalent to $NH_3$, $SO_2$, and $H_2O$, as set forth in Equation II hereinbefore). This is preferably carried out by diverting substantially one-half of the $NH_4HSO_4$ around the reduction operation and then combining this diverted $NH_4HSO_4$ with the product of the reduction operation to form $(NH_4)_2SO_4$ which is recycled and $SO_2$ which is recovered.

By controlling the process so that the amount of feed is substantially equal to the corresponding salt being cycled from step (1) to step (2), or from step (2) to step (1), respectively; and by reducing substantially one-half of the $NH_4HSO_4$ in step (2), the process is controlled to produce $NH_3$ and $SO_2$ in amounts substantially corresponding to the $NH_4$ and sulfate content in the feed.

The invention is further llustrated in the following examples:

Example 1

For decomposition of 66 kgs. spent $(NH_4)_2SO_4$ into $NH_3$ and $SO_2$, 132 kgs. ammonium sulphate are delivered within ten minutes to a receiver which contains about 111 kgs. of an $(NH_4)_2SO_4$ melt heated to 380°–400° C., whereby water and part of the ammonia escape. The reaction procedure is adjusted so that a sufficient quantity of heat is delivered to maintain the temperature between 380° C. and 400° C. A quantity of $(NH_4)_2SO_4$ melt equivalent to the feed is withdrawn continuously at the bottom of the vessel. The ammonium hydrogen sulphate and ammonium sulphate mixture flowing off is delivered to a packed column where the residual ammonia is expelled at 400° C. by superheated steam in counter-current flow. The escaping mixture of steam and about 17 kgs. $NH_3$ is condensed. The $NH_4HSO_4$ flowing off the column is evaporated by means of a hot $SO_2$ and $N_2$ gas mixture produced by the combustion of sulphur. One-half of said $NH_4SO_4$ is reduced at about 440° in direct current with 0.8 kg. sulphur vapor within 20 minutes. When cooling to at least 300° C., 64 kgs. ammonia sulphate and the $SO_2$ (32 kgs.) equivalent to the sulphate sulphur are obtained. The $(NH_4)_2SO_4$ returns together with new ammonium sulphate to the chemicals cycle.

The sulphur being contained in the $SO_2$ and not converted undergoes re-combustion and the $SO_2$ resulting therefrom is preferably delivered to a sulphuric acid plant.

Example 2

One-half of the $NH_4HSO_4$ flowing off the packed column as per Example 1, is evaporated and then reduced completely to $NH_4HSO_3$ which is at this temperature dissociated to $SO_2$, $NH_3$, and $H_2O$. This gas mixture is after combustion of the sulphur not being converted, cooled to about 170° C. and then converted in a spray dryer under injection of the remaining half of the $NH_4HSO_4$ into $(NH_4)_2SO_2$. The $(NH_4)_2SO_4$ obtained is returned again to the chemicals cycle.

Example 3

In a continuous plant, 10 kgs./min. of $NH_4HSO_4$ are circulated. 5 kgs. of this amount are branched off onto a furnace, in which they are reduced by means of 696 g./min. of sulfur to $NH_4HSO_3$. The required reaction temperature of about 450° C. is produced by burning of additional sulfur with air. At first the $NH_4HSO_3$ is washed out from the escaping reaction products with an aqueous ammonia-sulfate solution or with water and then the remaining half of the original $NH_4HSO_4$ is fed to this solution. The $SO_2$ is boiled off. The ammonium salt precipitated after evaporation of the water is fed to the plant in order to separate the ammonia. The ammonia which is becoming free is suitably dissolved in water. The losses are <5%. The obtained $SO_2$ can be liquified, reduced to sulfur or can be fed to a sulfuric acid plant.

As many embodiments of this invention may be made without departing from the spirit and scope thereof, it is to be understood that the present invention includes all such modifications and variations as come within the scope of the appended claims.

We claim:
1. A cyclic process for the recovery of $NH_3$ and $SO_2$ from a $(NH_4)_2SO_4$ rich feed comprising:
    (1) adding $(NH_4)_2SO_4$ to said feed and heating to a temperature between 200° C. and 450° C. to decompose said $(NH_4)_2SO_4$ and to form $NH_4HSO_4$ and $NH_3$, recovering said $NH_3$;
    (2) heating said $NH_4HSO_4$ with a non-carbon containing reducing agent at a temperature above the melting point of said $NH_4HSO_4$ whereby a portion of said $NH_4HSO_4$ is reduced to $NH_4HSO_3$ and is reacted with the unreduced $NH_4HSO_4$ to liberate $SO_2$ which is recovered, and to form $(NH_4)_2SO_4$; and
    (3) recycling said $(NH_4)_2SO_4$ to step (1);

wherein the process is controlled so that the $NH_3$ produced in said decomposition step (1) and the $SO_2$ produced in said reducing step (2) corespond to the initial $NH_4$ and sulfate content of said feed.

2. The cyclic process, as set forth in claim 1, wherein said feed is selected from the group consisting of $(NH_4)_2SO_4$ and a mixture of a major amount of $(NH_4)_2SO_4$ and a minor amount of $NH_4HSO_4$.

3. A cyclic process for the recovery of $NH_3$ and $SO_2$ from a $(NH_4)_2SO_4$ rich feed comprising
    (1) adding $(NH_4)_2SO_4$ to said feed and heating with steam at a temperature of between 200° C. and 450° C. to decompose said $(NH_4)_2SO_4$ and to form $NH_3$ and $NH_3HSO_4$, recovering said $NH_3$; and
    (2) (A) heating, said $NH_4HSO_4$ at about 450° C. with a reducing agent selected from the group consisting of $H_2$, S, and $H_2S$, to form $NH_4HSO_3$ and (B) reacting said $NH_4HSO_3$ with an equal weight of $NH_4HSO_4$ to form $SO_2$ which is recovered and to form $(NH_4)_2SO_4$ and (3) recycling said $(NH_4)_2SO_4$ to step (1);

wherein the process is controlled so that the $NH_3$ produced in said decomposition step (1) and the $SO_2$ produced in said reducing step (2) correspond to the initial $NH_4$ and sulfate content of the feed salt.

4. The process, as set forth in claim 3, wherein said $(NH_4)_2SO_4$ is heated with steam at a temperature of about 400° C.

5. The cyclic process, as set forth in claim 4, wherein said feed is selected from the group consisting of $(NH_4)_2SO_4$, and a mixture of a major amount of $(NH_4)_2SO_4$ and a minor amount of $NH_4HSO_4$.

6. A cyclic process for the recovery of $NH_3$ and $SO_2$ from a feed rich in $NH_4HSO_4$, comprising:
 (1) adding $NH_4HSO_4$ to said feed and heating with a non-carbon containing reducing agent at a temperature above the melting point of said $NH_4HSO_4$ whereby a portion of said $NH_4HSO_4$ is reduced to $NH_4HSO_3$ and is reacted with the unreduced $NH_4HSO_4$ to liberate $SO_2$ which is recovered, and to form $(NH_4)_2SO_4$; and
 (2) heating said $(NH_4)_2SO_4$ to a temperature between 200° C. and 450° C. to decompose said $(NH_4)_2SO_4$ and to form $NH_4HSO_4$, and $NH_3$ which is recovered and
 (3) recycling said $NH_4HSO_4$ to step (1);

wherein the process is controlled so that the $NH_3$ produced in said decomposition step (2) and the $SO_2$ produced in said reducing step (1) corresponds to the initial $NH_4$ and the sulfate content of said feed.

7. The process as set forth in claim 6 wherein said $(NH_4)_2SO_4$ is heated with steam at a temperature of about 400° C.

8. The cyclic process, as set forth in claim 6, wherein said feed is selected from the group consisting of $NH_4HSO_4$, and a mixture of a major amount of $NH_4HSO_4$ and a minor amount of $(NH_4)_2SO_4$.

9. The cyclic process, as set forth in claim 7, wherein said feed is selected from the group consisting of $NH_4HSO_4$, and a mixture of a major amount of $NH_4HSO_4$ and a minor amount of $(NH_4)_2SO_4$.

10. A cyclic process for the recovery of $NH_3$ and $SO_2$ from a feed rich in $NH_4HSO_4$, comprising:
 (1) (A) adding $NH_4HSO_4$ to said feed and heating at about 450° C. with a reducing agent selected from the group consisting of $H_2$, S, and $H_2S$, to form $NH_4HSO_3$, and (B) reacting said $NH_4HSO_3$ with an equal weight of $NH_4HSO_4$ to form $SO_2$ which is recovered, and to form $(NH_4)_2SO_4$; and
 (2) heating said $(NH_4)_2SO_4$ with steam to a temperature between 200° C. and 450° C. to decompose said $(NH_4)_2SO_4$ and to form $NH_4HSO_4$, and $NH_3$ which is recovered; and
 (3) recycling said $NH_4HSO_4$ to step (1);

wherein the process is controlled so that the $NH_3$ produced in said decomposition step (2) and the $SO_2$ produced in said reducing step (1) corresponds to the initial $NH_4$ and the sulfate content of said feed.

11. A cyclic process for the recovery of $NH_3$ and $SO_2$ from a feed rich in $(NH_4)_2SO_4$, comprising:
 (1) admixing said feed with a substantially equal amount of recycled $(NH_4)_2SO_4$ and passing said $(NH_4)_2SO_4$ counter-current to superheated steam at a temperature of about 400° C. to decompose said $(NH_4)_2SO_4$ into $NH_3$ and $NH_4HSO_4$, recovering said $NH_3$; and
 (2) introducing substantially one-half of said $NH_4HSO_4$ into a chamber at a temperature of about 450° C. wherein sulfur is added to reduce said $NH_4HSO_4$ into $NH_4HSO_3$ and then combining said $NH_4HSO_3$ with the remaining one-half of said $NH_4HSO_4$ to form $SO_2$ which is recovered, and $(NH_4)_2SO_4$; and
 (3) recycling said $(NH_4)_2SO_4$ to step (1).

12. A cyclic process for the recovery of $NH_3$ and $SO_2$ from a feed rich in $NH_4HSO_4$, comprising admixing said feed with a substantially equal amount of recycled $NH_4HSO_4$ and then introducing substantially one-half of said $NH_4HSO_4$ into a chamber at a temperature of about 450° C., wherein sulfur is added to reduce said $NH_4HSO_4$ into $NH_4HSO_3$, and then combining said $NH_4HSO_3$ with the remaining one-half of said $NH_4HSO_4$ to form $SO_2$ which is recovered, and $(NH_4)_2SO_4$; and contacting said $(NH_4)_2SO_4$ with steam at a temperature of about 400° C. and counter-current to said steam, to decompose said $(NH_4)_2SO_4$ into $NH_3$ which is recovered, and into $NH_4HSO_4$ which is then admixed with said feed.

References Cited

UNITED STATES PATENTS 3,321,275  5/1967  Furkert et al. _____ 23—178
2,405,747  8/1946  Hixson et al. _____ 23—178

OTHER REFERENCES

Mellor: Comprehensive Treatise on Inorganic and Theoretical Chemistry, vol. 2, p. 705 (1922).

OSCAR R. VERTIZ, *Primary Examiner.*

BENJAMIN HENKIN, *Examiner.*

R. M. DAVIDSON, A. J. GREIF, *Assistant Examiners.*